(12) United States Patent
Liu

(10) Patent No.: US 12,022,513 B2
(45) Date of Patent: Jun. 25, 2024

(54) METHOD AND DEVICE FOR RANDOM ACCESS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 420 days.

(21) Appl. No.: 17/598,213

(22) PCT Filed: Mar. 26, 2019

(86) PCT No.: PCT/CN2019/079756
§ 371 (c)(1),
(2) Date: Sep. 24, 2021

(87) PCT Pub. No.: WO2020/191634
PCT Pub. Date: Oct. 1, 2020

(65) Prior Publication Data
US 2022/0167410 A1    May 26, 2022

(51) Int. Cl.
*H04W 74/08* (2024.01)
*H04L 5/00* (2006.01)
(Continued)

(52) U.S. Cl.
CPC ....... *H04W 74/0816* (2013.01); *H04L 5/0051* (2013.01); *H04W 56/001* (2013.01);
(Continued)

(58) Field of Classification Search
CPC .......... H04W 74/0816; H04W 56/001; H04W 72/0446; H04W 74/0841; H04W 74/0866;
(Continued)

(56) References Cited

U.S. PATENT DOCUMENTS 10,194,467 B2   1/2019 Fodor et al.
2019/0215864 A1 7/2019 Yang et al.
(Continued)

FOREIGN PATENT DOCUMENTS

CN   107371273 A    11/2017
KR   20170118735 A  10/2017
(Continued)

OTHER PUBLICATIONS

Office Action issued in Indian Application No. 202147048501 dated Mar. 23, 2022 with partial English translation, (6p).
(Continued)

*Primary Examiner* — Mewale A Ambaye
(74) *Attorney, Agent, or Firm* — Arch & Lake LLP

(57) ABSTRACT

A method and a device for random access are provided. The method may include that a base station transmits target indication information for indicating a ratio of target demodulation reference signals (DRSs) to a terminal. Further, the terminal determines a target listen before talk (LBT) mode corresponding to the ratio of target DRSs based on a correspondence between ratios of DRSs and LBT modes predefined in a protocol and transmits a physical random access channel (PRACH) for uplink random access to the base station through the target LBT mode.

7 Claims, 8 Drawing Sheets

(51) Int. Cl.
  *H04W 56/00* (2009.01)
  *H04W 72/0446* (2023.01)
  *H04W 74/0816* (2024.01)
  *H04W 74/0833* (2024.01)

(52) U.S. Cl.
  CPC ... *H04W 72/0446* (2013.01); *H04W 74/0841* (2013.01); *H04W 74/0866* (2013.01)

(58) Field of Classification Search
  CPC ......... H04W 74/0825; H04W 74/0453; H04W 74/08; H04W 74/00; H04W 74/006; H04W 74/0808; H04W 74/0833; H04L 5/0051
  See application file for complete search history.

(56) References Cited

U.S. PATENT DOCUMENTS

| | | | | |
|---|---|---|---|---|
| 2019/0297620 A1* | 9/2019 | Tian | ...................... | H04L 1/1867 |
| 2020/0260487 A1* | 8/2020 | Bhattad | ................. | H04W 72/23 |
| 2020/0374703 A1* | 11/2020 | Jo | ........................ | H04W 16/14 |

FOREIGN PATENT DOCUMENTS

| | | | | |
|---|---|---|---|---|
| WO | 2016048227 A2 | 3/2016 | | |
| WO | 2018031136 A1 | 2/2018 | | |
| WO | WO-2020175950 A1 * | 9/2020 | ........... | H04L 1/1614 |

OTHER PUBLICATIONS

International Search Report of PCT Application No. PCT/CN2019/079756 dated Dec. 30, 2019 with English translation, (4p).
OPPO, "Channel Access Procedures for NR-U", 3GPP TSG RAN WG1 #96 R1-1901922, Athens, Greece, Feb. 16, 2019, (6p).
QUALCOMM, "Channel Access Procedures for NR Unlicensed", 3GPP TSG RAN WG1 Meeting #96, Athens, Greece, R1-1902985, Feb. 16, 2019, (15p).
MEDIATEK, "Initial Access Procedure in NR-U", 3GPP TSG RAN WG1 Meeting #95 R1-1812357, Spokane, WA, Nov. 12-16, 2018, (5p).

* cited by examiner

METHOD AND DEVICE FOR RANDOM ACCESS

CROSS-REFERENCE TO RELATED APPLICATION

This application is the U.S. national phase application of International Application No. PCT/CN2019/079756, filed on Mar. 26, 2019, the entire contents of which are incorporated herein by reference for all purposes.

TECHNICAL FIELD

The disclosure relates to the field of communication, and more particularly to a method and a device for random access.

BACKGROUND

Important content may include such as Listen Before Talk (LBT), Occupied Channel Bandwidth (OCB), Channel Occupancy Time (COT), for an unlicensed spectrum of a $5^{th}$ Generation Mobile Communication Technology (5G) system. i.e., a New Radio (NR) system.

The LBT is a most important mechanism coexisting with Wireless-Fidelity (Wi-Fi). An idle condition of a channel is listened to before transmitting. If the channel is occupied, information at a given time may not be transmitted, which brings a new challenge and a new demand to a design of the unlicensed spectrum.

A terminal needs to perform LBT monitoring before transmitting a Physical Random Access Channel (PRACH). An LBT mode may be a cat2 mode (a LBT mode without random backoff) or a cat4 mode (a LBT mode with random backoff and variable contention window size). The cat2 mode only performs LBT monitoring for 16 microseconds.

SUMMARY

According to a first aspect of the disclosure, there is provided a method for random access for a base station.

The method includes transmitting target indication information for indicating a ratio of target demodulation reference signals (DRSs) to a terminal. The terminal determines a target LBT mode corresponding to the ratio of target DRSs based on a correspondence between ratios of DRSs and LBT modes predefined in a protocol and transmits a PRACH for uplink random access to the base station through the target LBT mode.

According to a second aspect of the disclosure, there is provided a method for random access for a terminal.

The method includes that the terminal receives, from a base station, target indication information for indicating a ratio of target DRSs.

The method further includes that the terminal determines a target LBT mode corresponding to the ratio of target DRSs based on a correspondence between ratios of DRSs and LBT modes predefined in a protocol.

Moreover, the method includes that the terminal transmits a PRACH for uplink random access to the base station through the target LBT mode.

According to a third aspect of the disclosure, there is provided a method for random access for a base station.

The method includes that the base station transmits remaining minimum system information (RMSI) to a terminal. The terminal determines a ratio of target DRSs based on the RMSI, determines a target LBT mode corresponding to the ratio of target DRSs based on a correspondence between ratios of DRSs and LBT modes predefined in a protocol, and transmits a PRACH for uplink random access to the base station through the target LBT mode.

According to a fourth aspect of the disclosure, there is provided a method for random access for a terminal.

The method includes that the terminal receives RMSI from a base station.

The method further includes that the terminal determines a ratio of target DRSs based on the RMSI.

Moreover, the method includes that the terminal determines a target LBT mode corresponding to the ratio of target DRSs based on a correspondence between ratios of DRSs and LBT modes predefined in a protocol.

Furthermore, the method includes that the terminal transmits a PRACH for uplink random access to the base station through the target LBT mode.

According to a fifth aspect of the disclosure, there is provided a computer-readable storage medium having a computer program stored thereon. The computer program is configured to execute the method for random access according to the first aspect, the second aspect, the third aspect, or the fourth aspect.

According to a sixth aspect of the disclosure, there is provided a random access device for a base station.

The random access device includes a processor and a memory. The memory is configured to store instructions executable by the processor.

The processor is configured to transmit target indication information for indicating a ratio of target DRSs to a terminal. The terminal determines a target LBT mode corresponding to the ratio of target DRSs based on a correspondence between ratios of DRSs and LBT modes predefined in a protocol and transmits a PRACH for uplink random access to the base station through the target LBT mode.

According to a seventh aspect of the disclosure, there is provided a random access device for a terminal.

The random access device includes a processor and a memory. The memory is configured to store instructions executable by the processor.

The processor is configured to receive, from a base station, target indication information for indicating a ratio of target DRSs and determine a target LBT mode corresponding to the ratio of target DRSs based on a correspondence between ratios of DRSs and LBT modes predefined in a protocol.

The processor is further configured to transmit a PRACH for uplink random access to the base station through the target LBT mode.

According to an eighth aspect of the disclosure, there is provided a random access device for a base station.

The random access device includes a processor and a memory. The memory is configured to store instructions executable by the processor.

The processor is configured to transmit RMSI to a terminal. The terminal determines a ratio of target DRSs based on the RMSI, determines a target LBT mode corresponding to the ratio of target DRSs based on a correspondence between ratios of DRSs and LBT modes predefined in a protocol, and transmits a PRACH for uplink random access to the base station through the target LBT mode.

According to a ninth aspect of the disclosure, there is provided a random access device for a terminal.

The random access device includes a processor and a memory. The memory is configured to store instructions executable by the processor.

The processor is configured to receive RMSI from a base station.

The processor is further configured to determine a ratio of target DRSs based on the RMSI and determine a target LBT mode corresponding to the ratio of target DRSs based on a correspondence between ratios of DRSs and LBT modes predefined in a protocol.

Moreover, the processor is configured to transmit a PRACH for uplink random access to the base station through the target LBT mode.

It is to be understood that both the foregoing general description and the following detailed description are exemplary and explanatory merely and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Figure 1:
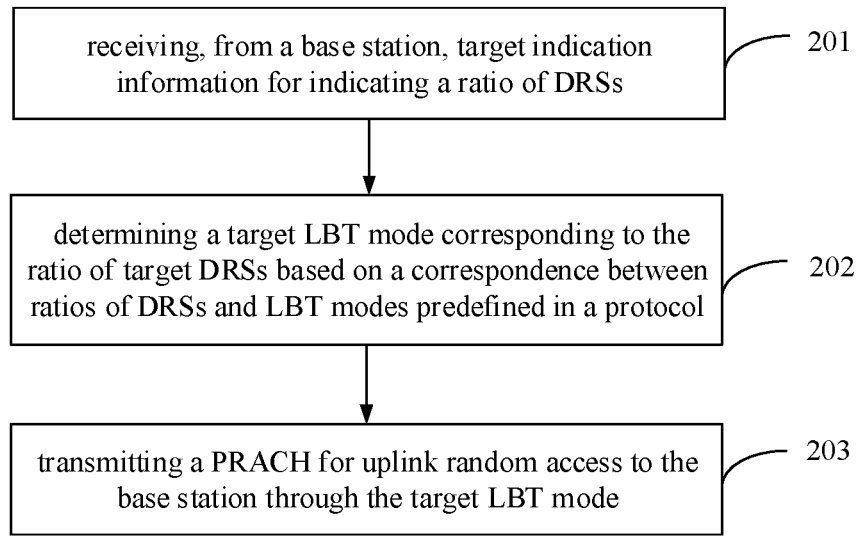
FIG. 1 is a flow chart illustrating a method for random access according to an exemplary embodiment.

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the disclosure. Instead, they are merely examples of apparatuses and methods consistent with some aspects of the disclosure as described in the appended claims.

The terms employed in the disclosure are merely for the purpose of describing detailed embodiments, and are not intended to limit the disclosure. As used in the disclosure and the appended claims, a singular form "a" or "the" is also intended to include plural forms, unless the context clearly indicates other meaning. It should also be understood that, the term "and/or" as used herein refers to including any or all possible combinations of one or more associated listed items.

It should be understood that, although terms "first, second, third and the like" may be employed in the disclosure to describe various kinds of information, the information should not be limited to these terms. These terms are merely used to distinguish the same type of information from each other. For example, without departing from a scope of the disclosure, first information may also be called second information, and similarly, the second information may also be called first information. Depending on the context, the word "if" as used herein may be interpreted as "when" or "in a case that . . . " or "in response to a determination".

In embodiments of the disclosure, a terminal may determine a target listen before talk (LBT) mode corresponding to a ratio of target demodulation reference signals (DRSs) based on a correspondence between ratios of DRSs and LBT modes predefined in a protocol, and transmit a physical random access channel (PRACH) through the target LBT mode during random access. A base station may enable the terminal to determine the ratio of target DRSs in any of following ways.

A first way is an explicit mode.

The base station may directly inform the terminal of the ratio of target DRSs through target indication information.

A second way is an implicit mode.

The base station may not directly transmit the ratio of target DRSs to the terminal, but may transmit an RMSI to the terminal. The terminal calculates the ratio of target DRSs based on the RMSI.

The first way described above will be introduced from the base station side.

Embodiments of the disclosure provide a method for random access. The method may be applicable to a base station in a 5G unlicensed spectrum. The method may include the following.

At block 101, target indication information for indicating a ratio of target DRSs is transmitted to a terminal. The terminal determines a LBT mode corresponding to the ratio of target DRSs based on a correspondence between ratios of DRSs and LBT modes predefined in a protocol and transmits a PRACH for uplink random access to the base station through the target LBT mode.

In the above embodiments, the base station may inform the terminal of the ratio of target DRSs through the target indication information and the terminal may determine the target LBT mode for transmitting the PRACH based on the correspondence between ratios of DRSs and LBT modes predefined in the protocol, such that the 5G unlicensed spectrum may be better compatible with Wi-Fi and the usability of the unlicensed spectrum is improved.

For the action at block 101, the ratio of DRSs is a percentage value of a duration corresponding to DRSs within a preset period to a total duration of the preset period.

Alternatively, the number of SSBs (SS (Synchronous Signaling)/PBCH (Physical Broadcast Channel) block) that the base station may transmit every 1 millisecond may be 1, 2, 3 or 4 within the preset period, such as 20 milliseconds.

For example, when the number of SSBs that the base station may transmit every 1 millisecond is 1, the base station may transmit the SSB at 0.25 milliseconds. For example, when the number of SSBs that the base station may transmit every 1 millisecond is 2, the base station may transmit an SSB at 0.25 milliseconds and transmit another SSB at 0.5 milliseconds. And so on, the base station transmits four SSBs every 1 millisecond at most.

Based on the SCS (SubCarrier Spacing) of the SSB mentioned above, the base station may determine a corresponding ratio of DRSs based on related technologies. In embodiments of the disclosure, the ratio of DRSs may be 0.25(25%), 0.5(50%), 0.75(75%) and 1(100%) respectively.

At this action, after the SCS of the SSB transmitted by the base station to the terminal is determined, one of the above percentage values may be determined as the ratio of target DRSs configured for the terminal.

Further, the base station may inform the terminal of the ratio of target DRSs through target indication information occupying 2 bits.

Alternatively, as the SCS is determined, the base station may employ a bit in the SSB used to indicate the SCS before and another bit may employ an unused bit in the RMSI (remaining minimum system information). The target indication information is characterized by bit values corresponding to the two bits, to inform the terminal of the ratio of target DRSs.

For example, in a case that the bit values corresponding to the two bits are 0 and 0, it indicates that the ratio of target DRSs is 0.25. In a case that the bit values corresponding to the two bits are 0 and 1, the ratio of target DRSs may be 0.5, and the like.

In some embodiments, alternatively, the base station may transmit the target indication information to the terminal through the SSB.

Next, description will be made to the first way from the terminal side.

Embodiments of the disclosure provide another method for random access. The method may be applicable to a terminal in a 5G unlicensed spectrum. As illustrated in FIG. 1, FIG. 1 is a flow chart illustrating a method for random access according to some embodiments. The method may include the following.

At block 201, target indication information for indicating a ratio of target DRSs is received from a base station.

At block 202, a target LBT mode corresponding to the ratio of target DRSs is determined based on a correspondence between ratios of DRSs and LBT modes predefined in a protocol.

At block 203, a PRACH for uplink random access is transmitted to the base station through the target LBT mode.

In the above embodiments, after the target indication information transmitted by the base station is received, the terminal may determine the target LBT mode corresponding to the ratio of target DRSs indicated by the target indication information based on the correspondence between ratios of DRSs and LBT modes predefined in the protocol and transmit the PRACH for uplink random access to the base station through the target LBT mode. Through the above process, the terminal may determine the target LBT mode for transmitting the PRACH based on the correspondence between ratios of DRSs and LBT modes predefined in the protocol, such that the 5G unlicensed spectrum may be better compatible with Wi-Fi and the usability of the unlicensed spectrum is improved.

For the action at block 201, the ratio of DRSs is a percentage value of a duration corresponding to DRSs within a preset period to a total duration of the preset period. The base station transmits the target indication information for indicating the ratio of target DRSs to the terminal through the SSB after directly determining the target DRS ratio among multiple ratios of DRSs and the terminal may directly receive the target indication information.

For the action at block 202, the terminal may determine the ratio of target DRSs based on a value corresponding to the target indication information after receiving the target indication information.

Further, the terminal may directly determine the target LBT mode corresponding to the ratio of target DRSs based on the correspondence between ratios of DRSs and LBT modes predefined in the protocol, for example, as illustrated in Table 1.

TABLE 1

| ratios of DRSs | LBT modes |
|---|---|
| 0.25 | cat2 |
| 0.5 | cat2 |
| 0.75 | cat2 |
| 1 | cat4 |

For the action at block 203, the terminal may transmit the PRACH to the base station through the target LBT mode determined by the action at block 202 when performing random access in the unlicensed spectrum. The PRACH in embodiments of the disclosure refers to an uplink PRBCH.

Figure 2:
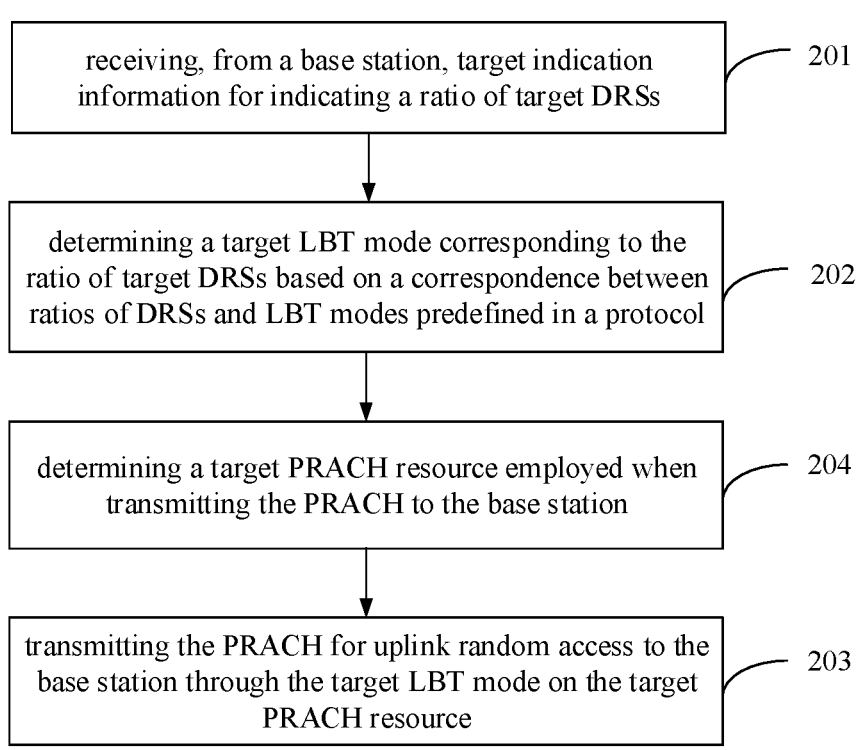
FIG. 2 is a flow chart illustrating a method for random access according to another exemplary embodiment.

In some embodiments, referring to FIG. 2, FIG. 2 is a flow chart illustrating another method for random access according to the embodiments illustrated in FIG. 1. The method also includes the following.

At block 204, a target PRACH resource employed when transmitting the PRACH is determined.

At this block, the terminal may determine the target PRACH resource for transmitting PRACH during random access. A way for determining the target PRACH resource will be described in following embodiments.

In embodiments of the disclosure, an execution order of the actions at block 202 and block 204 is not limited. The actions may be executed in parallel, or either one action may be executed sequentially and then the other action may be executed.

In embodiments of the disclosure, the action at block 203 may include the following.

The PRACH for uplink random access is transmitted to the base station through the target LBT mode on the target PRACH resource.

In other words, after determining the target LBT mode and the target PRACH resource, the terminal may transmit the PRACH for uplink random access to the base station through the target LBT mode on the target PRACH resource, that is, a corresponding RO (RACH (Random Access Channel) occasion).

In the above embodiments, the terminal may determine the target PRACH resource through the target LBT mode, which further improves a compatibility between the 5G unlicensed spectrum and Wi-Fi.

Figure 3:
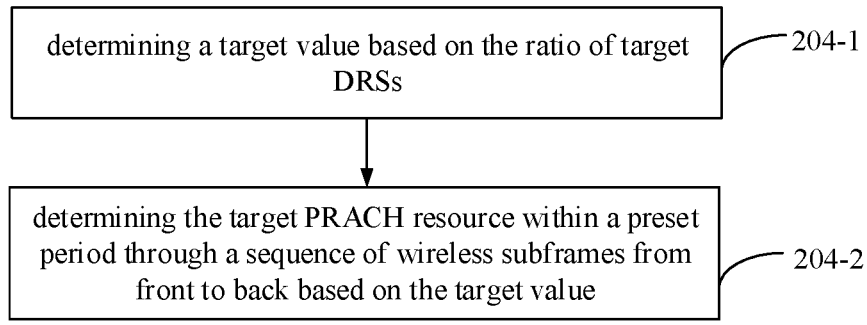
FIG. 3 is a flow chart illustrating a method for random access according to another exemplary embodiment.

In some embodiments, referring to FIG. 3, FIG. 3 is a flow chart illustrating another method for random access according to the embodiments illustrated in FIG. 2. The action at block 204 may include the following.

At block 204-1, a target value corresponding to the target PRACH resource is determined based on the ratio of target DRSs.

It should be noted that, within the preset period, in addition to subframes used for transmitting the DRS, subframes used for LBT monitoring and subframes used for transmitting the PRACH may also be included. Therefore, the target value corresponding to the target PRACH resource may be determined based on the ratio of target DRSs. The target value may not exceed 1 millisecond within a period of 20 milliseconds.

The terminal may first determine the target value corresponding to the target PRACH resource based on the ratio of target DRSs, for example, as illustrated in Table 2.

TABLE 2

| Target values | LBT modes |
|---|---|
| 0.25 | cat2 |
| 0.5 | cat2 |
| 0.75 | cat2 |
| 1 | cat4 |

In embodiments of the disclosure, a part of subframes need to be reserved for LBT monitoring. Therefore, the values in Table 2 may be rounded down to keep one decimal place, as illustrated in Table 3.

TABLE 3

| Target values | LBT modes |
|---|---|
| 0.2 | cat2 |
| 0.4 | cat2 |
| 0.7 | cat2 |
| 1 | cat4 |

At block 204-2, the target PRACH resource is determined within a preset period through a sequence of wireless subframes from front to back based on the target value.

Within the preset period, a time period corresponding to subframes where the DRS is located, a time period corresponding to subframes for LBT monitoring and a time period corresponding to subframes where the target PRACH resource is located may not overlap in time domain. That is, the terminal may set aside subframes for LBT monitoring in a sequence of wireless subframes from front to back except the subframes where the DRS is located and remaining subframes may be taken for the target PRACH resource in order.

It should be noted that, once the above three time periods overlap in the time domain, the target LBT mode needs to be adjusted to cat4.

In the above embodiments, the terminal may determine the target value corresponding to the target PRACH resource based on the ratio of target DRSs indicated by the target indication information and further determine the target PRACH resource within the preset period through the sequence of wireless subframes from front to back based on the target value. Through the above process, the terminal may determine the target PRACH resource employed when transmitting the PRACH and the usability of the target PRACH resource is high.

The process of determining the target PRACH resource is further illustrated as follows.

When the base station configures the ratio of DRSs, one DRS is configured for every 16 wireless subframes, so the ratio of target DRSs is $\frac{1}{16}=0.625$. At this time, the target value may be 0.2 and the corresponding target LBT mode is cat2.

When the target PRACH resource is determined, except the subframes occupied by DRSs and the subframes for LBT monitoring, the target PRACH resource may be determined from remaining subframes based on the sequence of wireless subframes from front to back.

It is assumed that the target PRACH resource is a resource with a configuration index of 0. Table 4 illustrates corresponding resources when partial configuration indexes are 0 and these resources may employ the cat2 mode.

TABLE 4

| Configuration index of PRACH | Preamble format | $n_{SFN}$modx = y x | $n_{SFN}$modx = y y | Subframe numeral | Starting symbol | The number of PRACHs in subframes | The number of opportunities of transmitting PRACH within a PRACH slot | Duration of PRACH |
|---|---|---|---|---|---|---|---|---|
| 0 | 0 | 16 | 1 | 1 | 0 | — | — | 0 | nSFNmodx = y represents that a DRS is configured in every multiple subframes.

Figure 4:
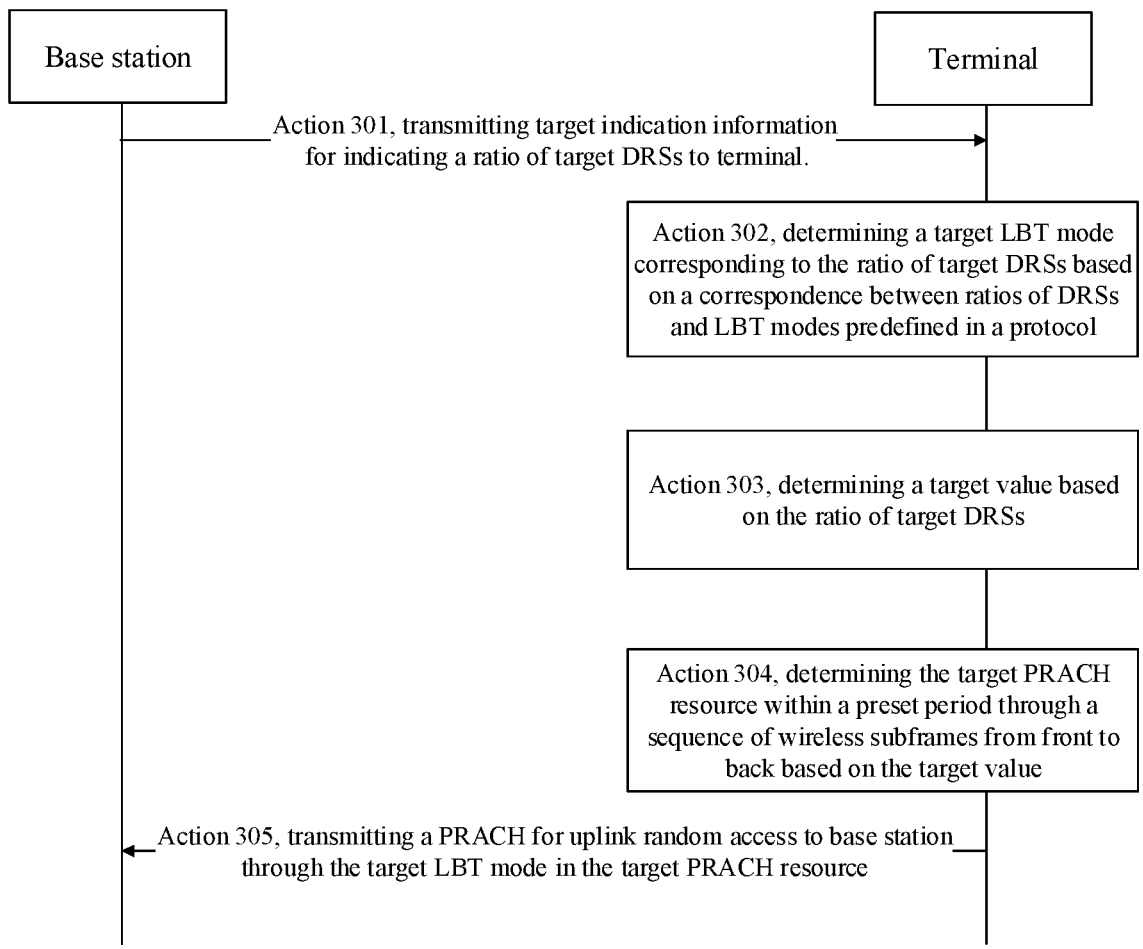
FIG. 4 is a flow chart illustrating a method for random access according to another exemplary embodiment.

In some embodiments, referring to FIG. 4, FIG. 4 is a flowchart illustrating a method for random access according to some exemplary embodiments. The method may include the following.

At action 301, a base station transmits target indication information for indicating a ratio of target DRSs to a terminal.

Alternatively, the base station may transmit the target indication information to the terminal through an SSB.

At action 302, the terminal determines a target LBT mode corresponding to the ratio of target DRSs based on a correspondence between ratios of DRSs and LBT modes predefined in a protocol.

At action 303, the terminal determines a target value corresponding to a target PRACH resource based on the ratio of target DRSs.

At action 304, the terminal determines the target PRACH resource within a preset period through a sequence of wireless subframes from front to back based on the target value.

At action 305, the terminal transmits a PRACH for uplink random access to the base station through the target LBT mode in the target PRACH resource.

In the above embodiments, the base station directly transmits the target indication information for indicating the ratio of target DRSs to the terminal in the explicit mode and the terminal determines the target LBT mode and the target PRACH resource respectively based on the ratio of target DRSs, such that the PRACH for uplink random access is transmitted to the base station through the target LBT mode on the target PRACH resource during random access. The compatibility between the 5G unlicensed spectrum and Wi-Fi is improved and the usability of the unlicensed spectrum is improved. In addition, by employing different LBT modes, it is beneficial to saving the terminal power.

In embodiments of the disclosure, the terminal may determine the target LBT mode corresponding to the ratio of target DRSs based on the correspondence between ratios of DRSs and LBTs predefined in the protocol, thereby employing the target LBT mode to transmit the PRACH during random access. The base station may enable the terminal to determine the ratio of target DRSs in any of following ways.

The second way described above will be described from the base station side.

Embodiments of the disclosure provide a method for random access. The method may be applicable to a base station in a 5G unlicensed spectrum. The method may include the following.

At block 401, remaining minimum system information (RMSI) is transmitted to a terminal. The terminal determines a ratio of target DRSs based on the RMSI, determines a target LBT mode corresponding to the ratio of target DRSs based on a correspondence between ratios of DRSs and LBT modes predefined in a protocol and transmits a PRACH for uplink random access to the base station through the target LBT mode.

In the above embodiments, the base station may not directly transmit target indication information to the terminal, but may transmit the RMSI to the terminal. The terminal determines the ratio of target DRSs based on the RMSI and the terminal may also determine the target LBT mode for transmitting the PRACH based on the ratio of target DRS. In this way, the 5G unlicensed spectrum may be better compatible with Wi-Fi and the usability of the unlicensed spectrum is improved.

For the action at block 401, the base station no longer directly informs the terminal of the ratio of target DRSs in the explicit mode, but transmits the RMSI to the terminal in the implicit mode. The terminal itself determines the ratio of target DRSs based on the RMSI.

The second mode will be described below from the terminal side.

Figure 5:
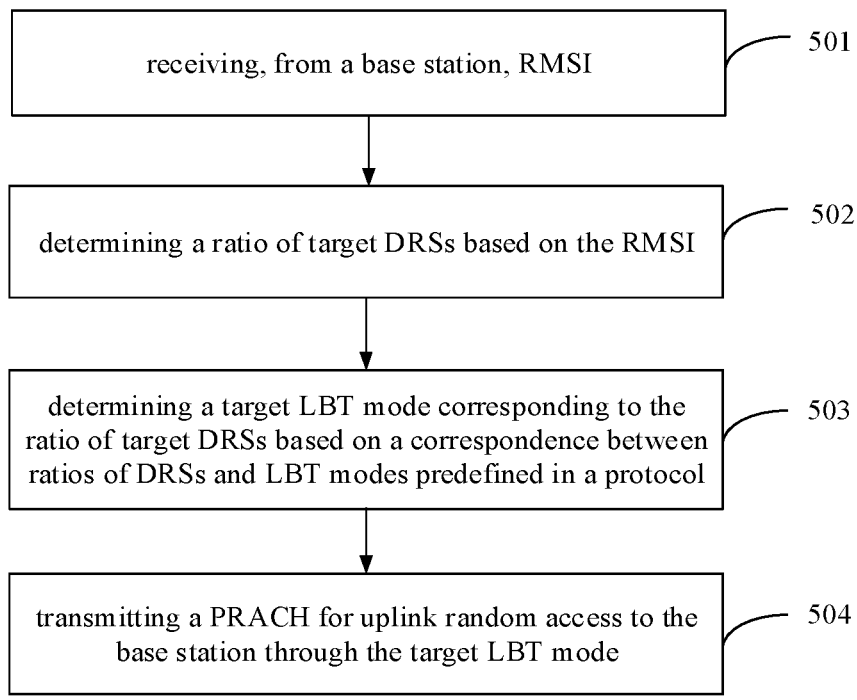
FIG. 5 is a flow chart illustrating a method for random access according to another exemplary embodiment.

Embodiments of the disclosure provide another method for random access. The method may be applicable to a terminal in a 5G unlicensed spectrum. As illustrated in FIG. 5, FIG. 5 is a flow chart illustrating a method for random access according to some embodiments. The method may include the following.

At block 501, RMSI is received from a base station.

At block 502, a ratio of target DRSs is determined based on the RMSI.

At block 503, a target LBT mode corresponding to the ratio of target DRSs is determined based on a correspondence between ratios of DRSs and LBT modes predefined in a protocol.

At block 503, a PRACH for uplink random access is transmitted to the base station through the target LBT mode.

In the above embodiments, the base station may not directly transmit target indication information to the terminal, but may transmit the RMSI to the terminal. The terminal determines the ratio of target DRSs based on the RMSI. The terminal may also be enabled to determine the target LBT mode for transmitting the PRACH based on the ratio of target DRSs. In this way, the 5G unlicensed spectrum may be better compatible with Wi-Fi and the usability of the unlicensed spectrum is improved.

For the action at block 501, the base station may not need to transmit the target indication information to the terminal, but may broadcast the RMSI to the terminal. The terminal directly receives the RMSI.

For the action at block 502, the terminal may determine the ratio of target DRSs based on a subcarrier spacing in the RMSI based on related technologies.

For the action at block 503, the terminal may also determine the target LBT mode corresponding to the ratio of target DRSs based on the correspondence between ratios of DRSs and LBT modes predefined in the protocol, as illustrated in Table 1.

For the action at block 504, the terminal may transmit the PRACH to the base station through the target LBT mode during random access. The PRACH in embodiments of the disclosure refers to an uplink PRACH.

Figure 6:
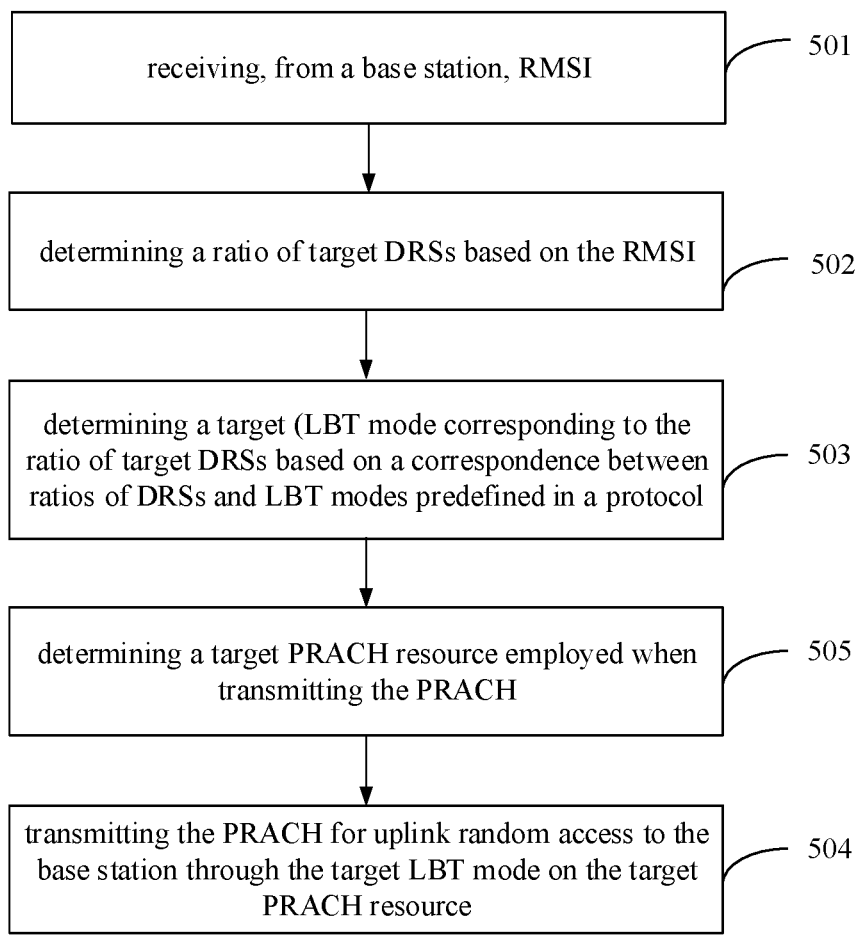
FIG. 6 is a flow chart illustrating a method for random access according to another exemplary embodiment.

In some embodiments, referring to FIG. 6, FIG. 6 is a flow chart illustrating another method for random access according to the embodiments illustrated in FIG. 5. The method also includes the following.

At block 505, a target PRACH resource employed when transmitting the PRACH is determined.

A way for determining the target PRACH resource at this action is the same as the way for determining the target PRACH resource at the block 204, which is not elaborated herein.

The execution order of the actions at blocks 503 and 505 is not limited in embodiments of the disclosure. The actions may be executed in parallel, or any one of them may be executed sequentially and then the other of them is executed.

Correspondingly, the action at block 504 may include the following.

The PRACH for uplink random access is transmitted to the base station through the target LBT mode on the target PRACH resource.

In other words, after the target LBT mode and the target PRACH resource are determined, the terminal may transmit the PRACH for uplink random access to the base station through the target LBT mode on the target PRACH resource, that is, a corresponding RO.

In the above embodiments, the terminal may be enabled to determine the target PRACH resource through the target LBT mode, which further improves the compatibility between the 5G unlicensed spectrum and Wi-Fi and improves the usability of the unlicensed spectrum. In addition, employing different LBT modes is beneficial to save the terminal power.

Figure 7:
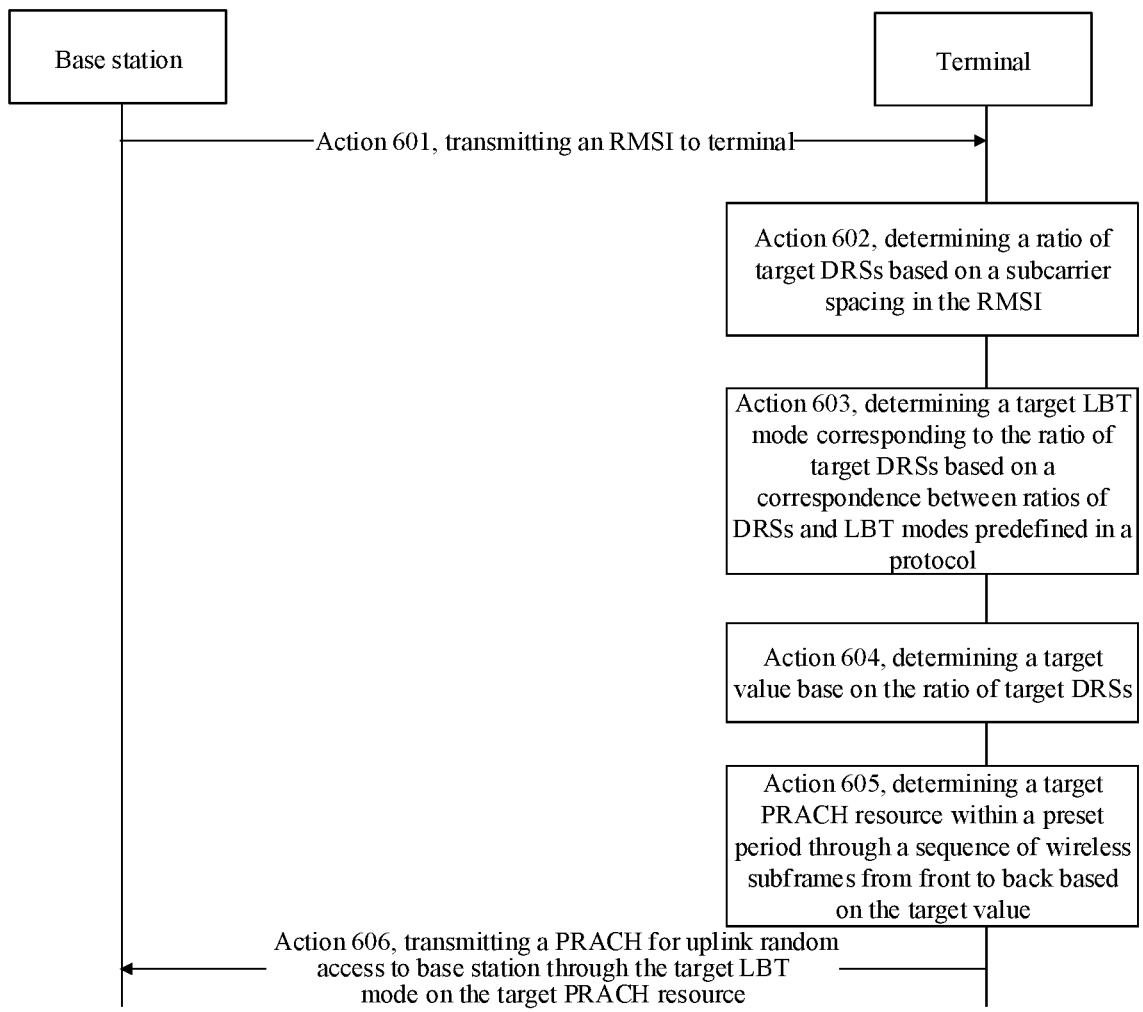
FIG. 7 is a flow chart illustrating a method for random access according to another exemplary embodiment.

In some embodiments, referring to FIG. 7, FIG. 7 is a flowchart illustrating another method for random access according to some exemplary embodiments. The method may include the following.

At action 601, a base station transmits an RMSI to a terminal.

At action 602, the terminal determines a ratio of target DRSs based on a subcarrier spacing in the RMSI.

At action 603, the terminal determines a target LBT mode corresponding to the ratio of target DRSs based on a correspondence between ratios of DRSs and LBT modes predefined in a protocol.

At action 604, the terminal determines a target value corresponding to a target PRACH resource base on the ratio of target DRSs.

At action 605, the terminal determines the target PRACH resource within a preset period through a sequence of wireless subframes from front to back based on the target value.

At action 606, the terminal transmits a PRACH for uplink random access to the base station through the target LBT mode on the target PRACH resource.

In the above embodiment, the base station transmits the RMSI to the terminal in the implicit mode and the terminal determines the ratio of target DRSs based on the RMSI. Further, the terminal determines the target LBT mode and the target PRACH resource respectively based on the ratio of target DRSs, such that the PRACH for uplink random access is transmitted to the base station through the target LBT mode on the target PRACH resource during random access. The compatibility between the 5G unlicensed spectrum and Wi-Fi is improved and the usability of the unlicensed spectrum is improved. In addition, different LBT modes are beneficial to saving the terminal power.

Corresponding to the above method embodiments of implementing application functions, the disclosure also provides apparatus embodiments of implementing application functions, a corresponding base station and a corresponding terminal.

Figure 8:
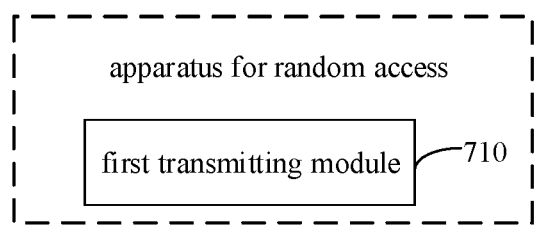
FIG. 8 is a block diagram illustrating an apparatus for random access according to an exemplary embodiment.

Referring to FIG. 8, FIG. 8 is a block diagram illustrating an apparatus for random access according to some exemplary embodiments. The apparatus is applicable to the base station. The apparatus includes a first transmitting module 710.

The first transmitting module 710 is configured to transmit target indication information for indicating a ratio of target DRSs to a terminal. The terminal determines a target LBT mode corresponding to the ratio of target DRSs based on a correspondence between ratios of DRSs and LBT modes predefined in a protocol and transmits a PRACH for uplink random access to the base station through the target LBT mode.

Figure 9:
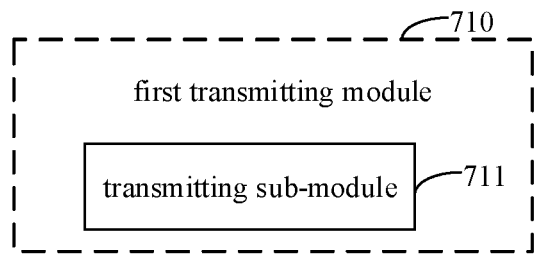
FIG. 9 is a block diagram illustrating an apparatus for random access according to another exemplary embodiment.

Referring to FIG. 9, FIG. 9 is a block diagram illustrating an apparatus for random access on the basis of the embodiments illustrated in FIG. 8. The first transmitting module 710 includes a transmitting sub-module 711.

The transmitting sub-module 711 is configured to transmit the target indication information to the terminal through an SSB.

Figure 10:
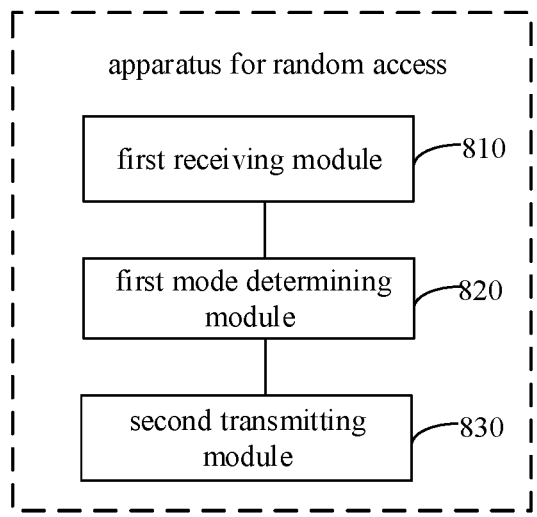
FIG. 10 is a block diagram illustrating another apparatus for random access according to an exemplary embodiment.

Referring to FIG. 10, FIG. 10 is a block diagram illustrating another apparatus for random access according to some exemplary embodiments. The apparatus is applicable to the terminal. The apparatus includes a first receiving module 810, a first mode determining module 820 and a second transmitting module 830.

The first receiving module 810 is configured to receive, from a base station, target indication information for indicating a ratio of target DRSs. The first mode determining module 820 is configured to determine a target LBT mode corresponding to the ratio of target DRSs based on a correspondence between ratios of DRSs and LBT modes predefined in a protocol.

The second transmitting module 830 is configured to transmit a PRACH for uplink random access to the base station through the target LBT mode.

Figure 11:
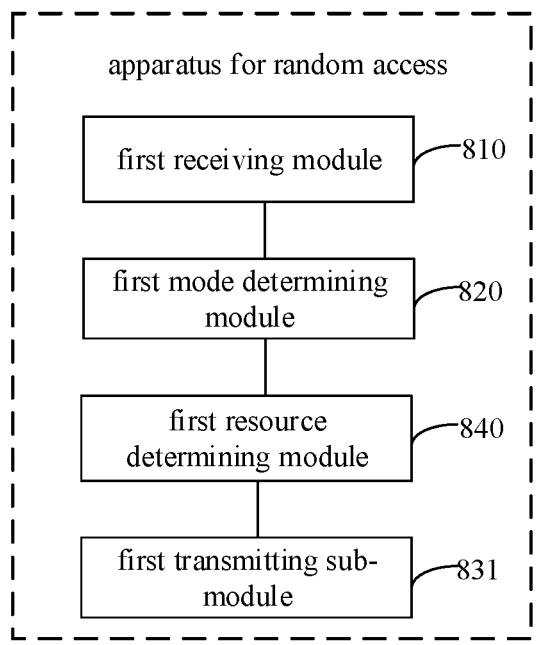
FIG. 11 is a block diagram illustrating an apparatus for random access according to another exemplary embodiment.

Referring to FIG. 11, FIG. 11 is a block diagram illustrating an apparatus for random access on the basis of the embodiments illustrated in FIG. 10. The apparatus also includes a first resource determining module 840.

The first resource determining module is configured to determine a target PRACH resource employed when transmitting the PRACH.

The second transmitting module 830 includes a first transmitting sub-module 831.

The first transmitting sub-module 831 is configured to transmit the PRACH for uplink random access to the base station through the target LBT mode on the target PRACH resource.

Figure 12:
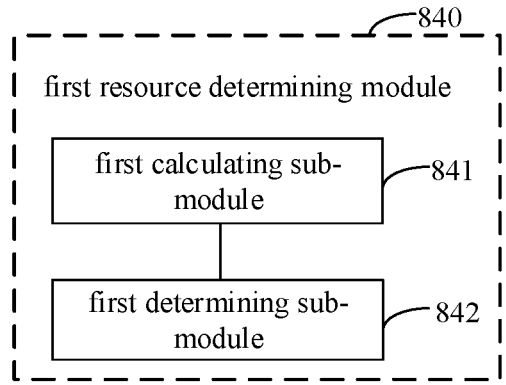
FIG. 12 is a block diagram illustrating an apparatus for random access according to another exemplary embodiment.

Referring to FIG. 12, FIG. 12 is a block diagram illustrating an apparatus for random access on the basis of the embodiments illustrated in FIG. 11. The first resource determining module 840 includes a first calculating sub-module 841 and a first determining sub-module 842.

The first calculating sub-module 841 is configured to determine a target value corresponding to the target PRACH resource based on the ratio of target DRSs.

The first determining sub-module 842 is configured to determine the target PRACH resource within a preset period through a sequence of wireless subframes from front to back based on the target value.

Figure 13:
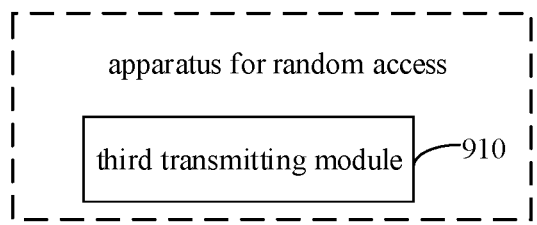
FIG. 13 is a block diagram illustrating another apparatus for random access according to an exemplary embodiment.

Referring to FIG. 13, FIG. 13 is a block diagram illustrating another apparatus for random access according to some exemplary embodiments. The apparatus is applicable to the base station. The apparatus includes a third transmitting module 910.

The third transmitting module 910 is configured to transmit RMSI to a terminal. The terminal determines a ratio of target DRSs based on the RMSI, determines a target LBT mode corresponding to the ratio of target DRSs based on a correspondence between ratios of DRSs and LBT modes predefined in a protocol, and transmits a PRACH for uplink random access to the base station through the target LBT mode.

Figure 14:
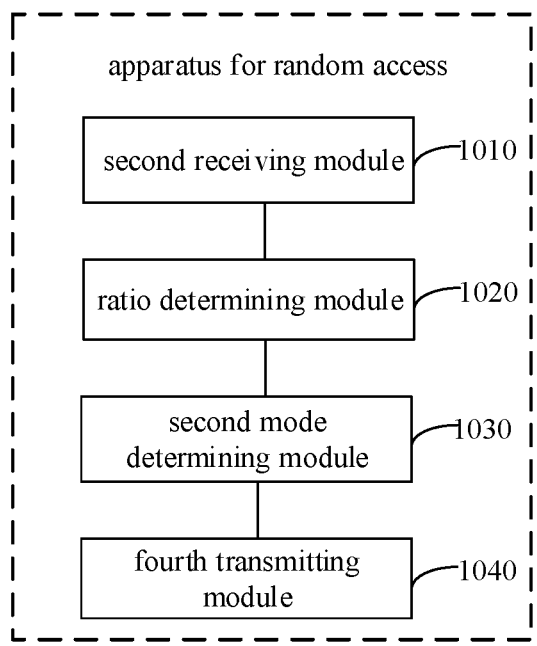
FIG. 14 is a block diagram illustrating another apparatus for random access according to an exemplary embodiment.

Referring to FIG. 14, FIG. 14 is a block diagram illustrating another apparatus for random access according to some exemplary embodiments. The apparatus is applicable to the terminal. The apparatus includes a second receiving module 1010, a ratio determining module 1020, a second mode determining module 1030 and a fourth transmitting module 1040.

The second receiving module 1010 is configured to receive RMSI from a base station.

The ratio determining module 1020 is configured to determine a ratio of target DRSs based on the RMSI. The second mode determining module 1030 is configured to determine a target LBT mode corresponding to the ratio of target DRSs based on a correspondence between ratios of DRSs and LBT modes predefined in a protocol.

The fourth transmitting module 1040 is configured to transmit a PRACH for uplink random access to the base station in the target LBT mode.

Figure 15:
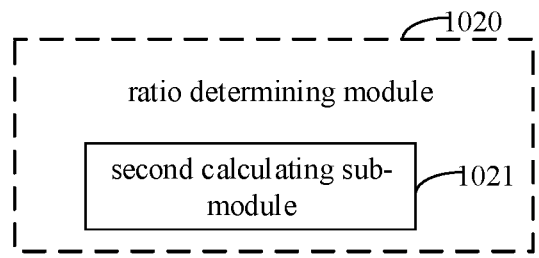
FIG. 15 is a block diagram illustrating an apparatus for random access according to another exemplary embodiment.

Referring to FIG. 15, FIG. 15 is a block diagram illustrating an apparatus for random access on the basis of the embodiments illustrated in FIG. 14. The ratio determining module 1020 includes a second calculating sub-module 1021.

The second calculating sub-module 1021 is configured to determine the ratio of target DRSs based on a subcarrier spacing in the RMSI.

Figure 16:
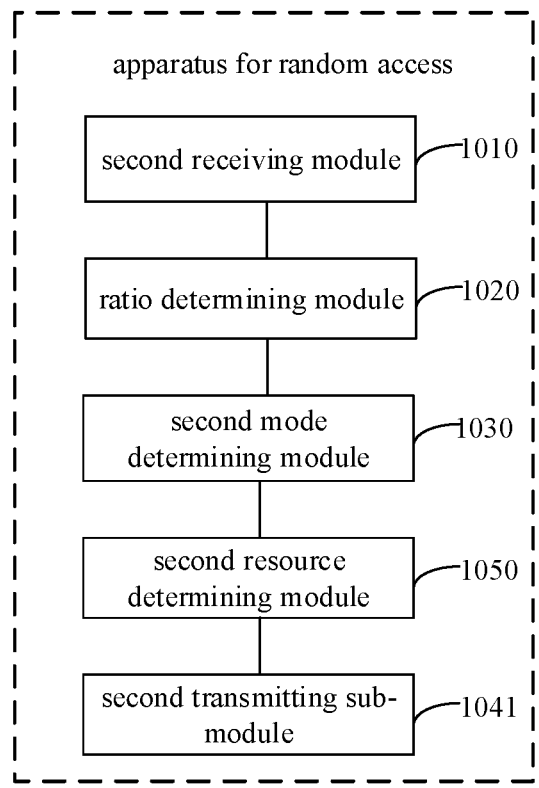
FIG. 16 is a block diagram illustrating an apparatus for random access according to another exemplary embodiment.

Referring to FIG. 16, FIG. 16 is a block diagram illustrating an apparatus for random access on the basis of the embodiments illustrated in FIG. 14. The apparatus also includes a second resource determining module 1050.

The second resource determining module 1050 is configured to determine a target PRACH resource employed when transmitting the PRACH.

The fourth transmitting module 1040 includes a second transmitting sub-module 1041.

The second transmitting sub-module 1041 is configured to transmit the PRACH for uplink random access to the base station through the target LBT mode on the target PRACH resource.

Figure 17:
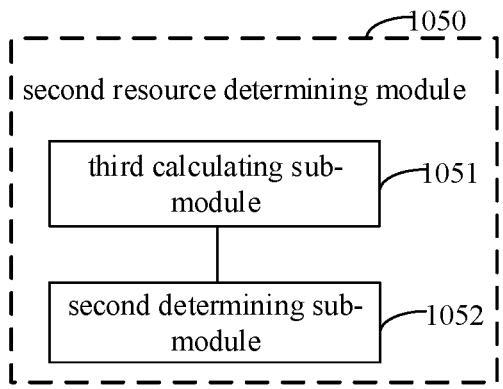
FIG. 17 is a block diagram illustrating an apparatus for random access according to another exemplary embodiment.

Referring to FIG. 17, FIG. 17 is a block diagram illustrating an apparatus for random access on the basis of the embodiments illustrated in FIG. 16. The second resource determining module 1050 includes a third calculating sub-module 1051 and a second determining sub-module 1052.

The third calculating sub-module 1051 is configured to determine a target value corresponding to the target PRACH resource based on the ratio of target DRSs.

The second determining sub-module 1052 is configured to determine the target PRACH resource within a preset period through a sequence of wireless subframes from front to back based on the target value.

With respect to the apparatus embodiments, since they basically correspond to the method embodiments, relevant parts of the apparatus embodiments may refer to parts of the description of the method embodiments. The apparatus embodiments described above are merely illustrative. The units described above as separate components may or may not be physically separated, and the components displayed as units may or may not be physical units, that is, they may be located in one place or distributed to multiple network units. Some or all of the modules may be selected based on actual needs to achieve the objectives of the solutions of the disclosure. Those of ordinary skill in the art may understand and implement it without creative work.

Correspondingly, the disclosure also provides a computer-readable storage medium having a computer program stored thereon. The computer program is configured to execute any of the methods for random access for the base station in the above first way.

Correspondingly, the disclosure also provides a computer-readable storage medium having a computer program stored thereon. The computer program is configured to execute any of the methods for random access for the terminal in the above first way.

Correspondingly, the disclosure also provides a computer-readable storage medium having a computer program stored thereon. The computer program is configured to execute any of the methods for random access for the base station in the above second way.

Correspondingly, the disclosure also provides a computer-readable storage medium having a computer program stored thereon. The computer program is configured to execute any of the methods for random access for the terminal in the above second way.

Correspondingly, the disclosure also provides a random access device, for a base station.

The random access device includes a processor.

The random access device further includes a memory. The memory is configured to store instructions executable by the processor.

The processor is configured to perform the following action.

The processor is configured to transmit target indication information for indicating a ratio of target DRSs to a terminal. The terminal determines a target LBT mode corresponding to the ratio of target DRSs based on a correspondence between ratios of DRSs and LBT modes predefined in a protocol and transmits a PRACH for uplink random access to the base station through the target LBT mode.

Correspondingly, the disclosure also provides a random access device, for a terminal.

The random access device includes a processor.

The random access device further includes a memory. The memory is configured to store instructions executable by the processor.

The processor is configured to perform the following action.

The processor is configured to receive, from a base station, target indication information for indicating a ratio of target DRSs.

The processor is further configured to determine a target LBT mode corresponding to the ratio of target DRSs based on a correspondence between ratios of DRSs and LBT modes predefined in a protocol.

The processor is also further configured to transmit a PRACH for uplink random access to the base station through the target LBT mode.

Correspondingly, the disclosure also provides a random access device, for a base station.

The random access device includes a processor.

The random access device further includes a memory. The memory is configured to store instructions executable by the processor.

The processor is configured to perform the following action.

The processor is configured to transmit RMSI to a terminal. The terminal determines a ratio of target DRSs based on the RMSI, determines a target LBT mode corresponding to the ratio of target DRSs based on a correspondence between ratios of DRSs and LBT modes predefined in a protocol, and transmits a PRACH for uplink random access to the base station through the target LBT mode.

Correspondingly, the disclosure also provides a random access device, for a terminal.

The random access device includes a processor.

The random access device further includes a memory. The memory is configured to store instructions executable by the processor.

The processor is configured to perform the following action.

The processor is configured to receive, from a base station, RMSI.

The processor is further configured to determine a ratio of target DRSs based on the RMSI.

The processor is further configured to determine a target LBT mode corresponding to the ratio of target DRSs based on a correspondence between ratios of DRSs and LBT modes predefined in a protocol.

The processor is also further configured to transmit a PRACH for uplink random access to the base station through the target LBT mode.

Figure 18:
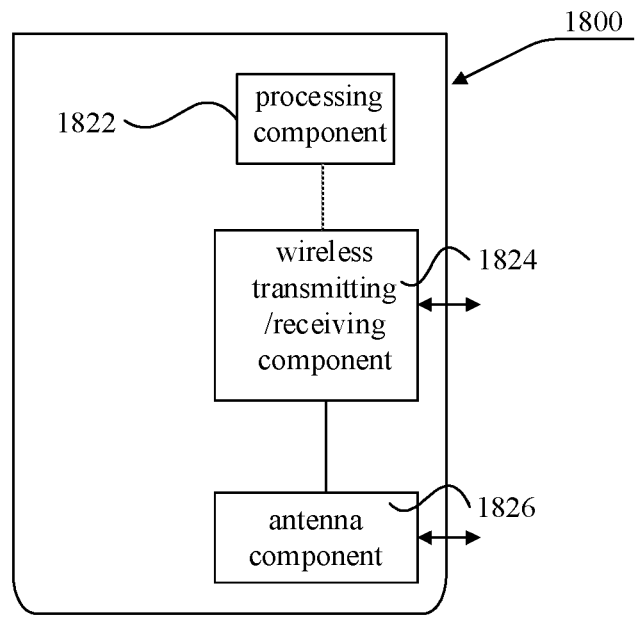
FIG. 18 is a block diagram illustrating a random access device according to an exemplary embodiment of the disclosure.

As illustrated in FIG. 18, FIG. 18 is a block diagram illustrating a random access device according to some exemplary embodiments of the disclosure. The device 1800 may be provided as a base station in the unlicensed spectrum. Referring to FIG. 18, the device 1800 includes a processing component 1822, a wireless transmitting/receiving component 1824, an antenna component 1826 and a signal processing part specific to a wireless interface. The processing component 1822 may further include one or more processors.

One of the processors in the processing component 1822 may be configured to execute any of the methods for random access for the base station described above.

Figure 19:
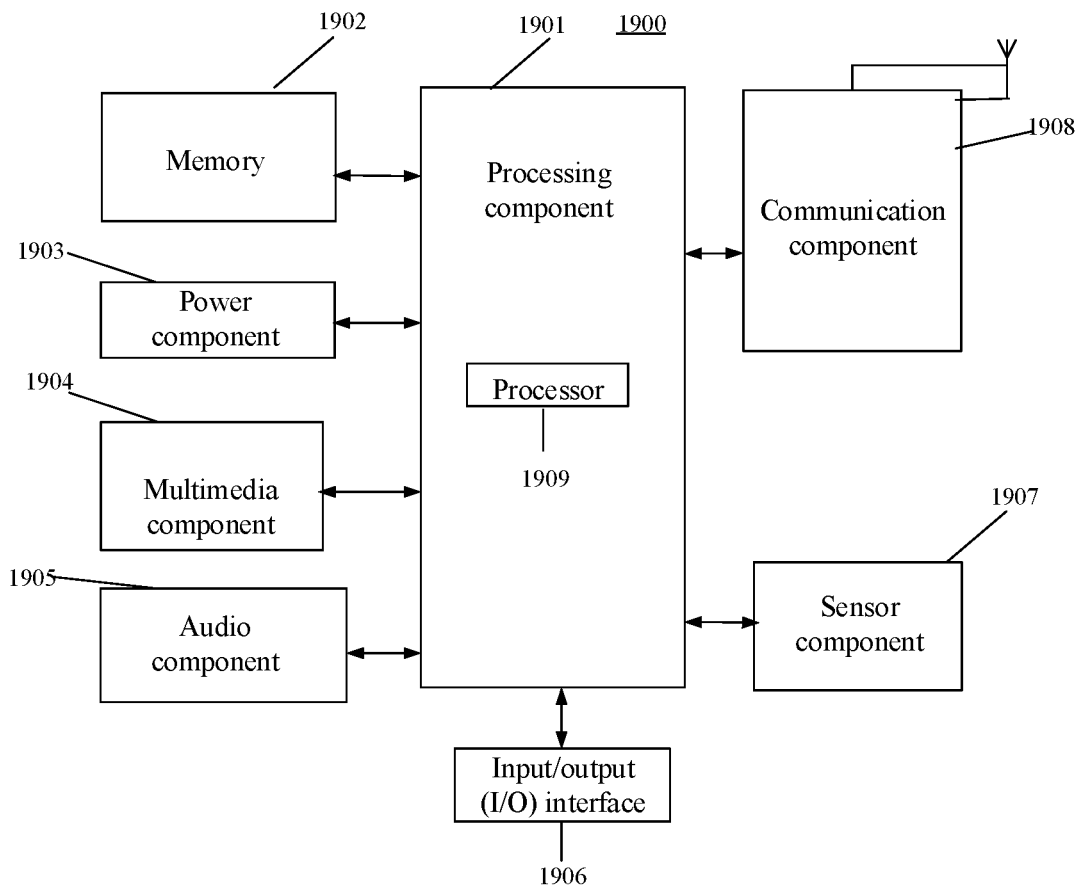
FIG. 19 is a block diagram illustrating a random access device according to another exemplary embodiment of the disclosure.

FIG. 19 is a block diagram illustrating a random access device according to some exemplary embodiments of the disclosure. A random access device 1900 according to some exemplary embodiments is illustrated in FIG. 19. The device 1900 may be a terminal in the unlicensed spectrum such as a computer, a mobile phone, a digital broadcasting terminal, message transceiving equipment, a game console, tablet equipment, medical equipment, fitness equipment, or a personal digital assistant.

As illustrated in FIG. 19, the device 1900 may include one or more of: a processing component 1901, a memory 1902, a power component 1903, a multimedia component 1904, an audio component 1905, an input/output (I/O) interface 1906, a sensor component 1907, and a communication component 1908.

The processing component 1901 typically controls overall operations of the device 1900, such as the operations associated with display, telephone calls, data communications, camera operations, and recording operations. The processing component 1901 may include one or more processors 1901 for executing instructions to implement all or a part of the above method. Moreover, the processing component 1901 may include one or more modules which facilitate the interaction between the processing component 1901 and other components. For example, the processing component 1901 may include a multimedia module to facilitate the interaction between the multimedia component 1904 and the processing component 1901.

The memory 1902 is configured to store various types of data to support the operation of the device 1900. Examples of such data include instructions for any application or method operated on the device 1900 for performing contraction data, phonebook data, messages, pictures, video, etc. The memory 1902 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1903 is configured to provide power to various components of the device 1900. The power component 1903 may include a power management system, one or more power sources, and any other components associated with the generation, management, and distribution of power in the device 1900.

The multimedia component 1904 includes a screen for providing an output interface between the device 1900 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1904 includes a front camera and/or a rear camera. When the device 1900 is in an operation mode, such as a shooting mode or a video mode, the front camera and/or the rear camera may receive external multimedia data. Each front camera and rear camera may be a fixed optical lens system or have a focal length and an optical zoom capability.

The audio component 1905 is configured to output and/or input an audio signal. For example, the audio component 1905 includes a microphone ("MIC") for receiving an external audio signal when the device 1900 is in an operation mode, such as a call mode, a recording mode, and a voice recognition mode. The received audio signal may be further stored in the memory 1902 or transmitted via the communication component 1908. In some embodiments, the audio component 1905 further includes a speaker for outputting the audio signal.

The I/O interface 1906 is configured to provide an interface between the processing component 1901 and peripheral interface modules, such as a keyboard, a click wheel, buttons, and the like. These buttons may include, but be not limited to, a home button, a volume button, a start button, and a lock button.

The sensor component 1907 includes one or more sensors for providing status assessments of various aspects of the device 1900. For example, the sensor component 1907 may detect an open/closed state of the device 1900, relative positioning of components, e.g., the display and the keypad of the device 1900, a position change of the device 1900 or a component of the device 1900, a presence or absence of user contraction with the device 1900, an orientation or an acceleration/deceleration of the device 1900, and a temperature change of the device 1900. The sensor component 1907 may include a proximity sensor configured to detect the presence of nearby objects without any physical contact. The sensor component 1907 may also include an optical sensor, such as a CMOS or CCD image sensor, for use in an imaging application. In some embodiments, the sensor component 1907 may also include an acceleration sensor, a gyro sensor, a magnetic sensor, a pressure sensor or a temperature sensor.

The communication component 1908 is configured to facilitate communication, wired or wirelessly, between the device 1900 and other devices. The device 1900 may access a wireless network based on a communication standard, such as Wi-Fi, 2G, 3G, or a combination thereof. In an exemplary embodiment, the communication component 1908 receives a broadcast signal or broadcast associated information from an external broadcast management system via a broadcast channel. In an exemplary embodiment, the communication component 1908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In some exemplary embodiments, there is also provided a non-transitory computer-readable storage medium including instructions, such as the memory 1902 including the instructions. The instructions may be executed by the processor 1909 in the device 1900 for performing the above method. For example, the non-transitory computer-readable storage medium may be a ROM, a RAM, a CD-ROM, a magnetic tape, a floppy disc, an optical data storage device, and the like.

When instructions in the storage medium are executed by the processor, the apparatus 1900 may execute any of the methods for random access for the terminal described above.

The technical solutions provided in embodiments of the disclosure may include following beneficial effects.

In embodiments of the disclosure, the base station may inform the terminal of the ratio of target DRSs through the target indication information and the terminal may determine the target LBT mode for transmitting the PRACH based on the correspondence between ratios of DRSs and LBT modes predefined in the protocol, such that a 5G unlicensed spectrum may be better compatible with Wi-Fi and a usability of the unlicensed spectrum is improved.

In embodiments of the disclosure, alternatively, the base station may transmit the target indication information to the terminal through the SSB, which is easy to implement and has a high usability.

In embodiments of the disclosure, after the target indication information transmitted by the base station is received, the terminal may determine the target LBT mode corresponding to the ratio of target DRSs indicated by the target indication information based on the correspondence between ratios of DRSs and LBT modes predefined in the protocol and then transmit the PRACH for uplink random access to the base station through the target LBT mode. Through the above process, the terminal may determine the target LBT mode for transmitting the PRACH based on the correspondence between ratios of DRSs and LBT modes predefined in the protocol, such that a 5G unlicensed spectrum may be better compatible with Wi-Fi and a usability of the unlicensed spectrum is improved.

In embodiments of the disclosure, alternatively, the terminal may also determine the target PRACH resource employed when transmitting the PRACH and then transmits the PRACH for uplink random access to the base station through the target LBT mode on the target PRACH resource. In the above embodiments, the terminal may determine the target PRACH resource through the target LBT mode, which further improves the compatibility between the 5G unlicensed spectrum and Wi-Fi and improves the usability of the unlicensed spectrum. In addition, employing different LBT modes is beneficial to save the terminal power.

In embodiments of the disclosure, the terminal may determine the target value corresponding to the target PRACH resource based on the ratio of target DRSs indicated by the target indication information and further determine the target PRACH resource within the preset period through the sequence of wireless subframes from front to back based on the target value. Through the above process, the terminal may determine the target PRACH resource adopted employed when transmitting the PRACH and the usability of the target PRACH resource is high.

In embodiments of the disclosure, the base station may transmit the RMSI to the terminal. After the terminal determines the ratio of target DRSs based on the RMSI, the terminal determines the target LBT mode corresponding to the ratio of target DRSs based on the correspondence between ratios of DRSs and LBT modes predefined in the protocol and then transmit the PRACH for uplink random access to the base station through the target LBT mode during random access. Through the above process, the base station may not directly transmit the target indication information to the terminal, but transmits the RMSI to the terminal. The terminal determines the ratio of target DRSs based on the RMSI, such that the terminal may also determine the target LBT mode for transmitting the PRACH based on the ratio of target DRSs. In this way, a 5G unlicensed spectrum may be better compatible with Wi-Fi and a usability of the unlicensed spectrum is improved.

In embodiments of the disclosure, the terminal may determine the ratio of target DRSs based on the subcarrier spacing in the RMSI transmitted by the basis station, further determine the target LBT mode corresponding to the ratio of target DRSs, and then the PRACH is transmitted through the target LBT mode, such that the 5G unlicensed spectrum may be better compatible with Wi-Fi.

Other implementations of the disclosure will be apparent to the skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for random access, comprising:
    transmitting, by a base station, target indication information for indicating a ratio of target demodulation reference signals (DRSs) to a terminal, wherein the ratio of DRSs is a percentage value of a duration corresponding to DRSs within a preset period to a total duration of the preset period, the target indication information enabling the terminal to determine a target listen before talk (LBT) mode corresponding to the ratio of target DRSs based on a correspondence between ratios of DRSs, and LBT modes, predefined in a protocol, and to transmit a physical random access channel (PRACH) for uplink random access to the base station through the target LBT mode;
    wherein transmitting the target indication information to the terminal comprises:
    transmitting the target indication information to the terminal through a synchronous signaling block (SSB) and a remaining minimum system information (RMSI), wherein the target indication information comprises two bits, one of the two bits is a bit in the SSB used to indicate a subcarrier spacing (SCS) before and another of the two bits is an unused bit in the RMSI.

2. A method for random access, comprising:
    receiving, by a terminal, target indication information for indicating a ratio of target demodulation reference signals (DRSs) from a base station, wherein the ratio of DRSs is a percentage value of a duration corresponding to DRSs within a preset period to a total duration of the preset period;
    determining, by the terminal, a target listen before talk (LBT) mode corresponding to the ratio of target DRSs based on a correspondence between ratios of DRSs, and LBT modes, predefined in a protocol; and
    transmitting, by the terminal, a physical random access channel (PRACH) for uplink random access to the base station through the target LBT mode;

wherein the target indication information is carried in a synchronous signaling block (SSB) and a remaining minimum system information (RMSI), wherein the target indication information comprises two bits, one of the two bits is a bit in the SSB used to indicate a subcarrier spacing (SCS) before and another of the two bits is an unused bit in the RMSI.

3. The method as claimed in claim 2, further comprising:
determining a target PRACH resource employed upon transmitting the PRACH;
wherein transmitting the PRACH for uplink random access to the base station through the target LBT mode comprises:
transmitting the PRACH for uplink random access to the base station through the target LBT mode on the target PRACH resource.

4. The method as claimed in claim 3, wherein determining the target PRACH resource employed upon transmitting the PRACH comprises:
determining a target value corresponding to the target PRACH resource based on the ratio of target DRSs; and
determining the target PRACH resource within a preset period through a sequence of wireless subframes from front to back based on the target value.

5. A method for random access, comprising:
receiving, by a terminal, remaining minimum system information (RMSI) from a base station;
determining, by the terminal, a ratio of target demodulation reference signals (DRS) based on the RMSI, wherein the ratio of DRSs is a percentage value of a duration corresponding to DRSs within a preset period to a total duration of the preset period;
determining, by the terminal, a target listen before talk (LBT) mode corresponding to the ratio of target DRSs based on a correspondence between ratios of DRSs, and LBT modes, predefined in a protocol; and
transmitting, by the terminal, a physical random access channel (PRACH) for uplink random access to the base station through the target LBT mode;
wherein determining the ratio of target DRSs based on the RMSI comprises:
determining the ratio of target DRSs based on a subcarrier spacing in the RMSI.

6. The method as claimed in claim 5, further comprising:
determining, by the terminal, a target PRACH resource employed when transmitting the PRACH;
wherein transmitting the PRACH for uplink random access to the base station through the target LBT mode comprises:
transmitting the PRACH for uplink random access to the base station through the target LBT mode on the target PRACH resource.

7. The method as claimed in claim 6, wherein determining the target PRACH resource employed when transmitting the PRACH comprises:
determining a target value corresponding to the target PRACH resource based on the ratio of target DRSs; and
determining the target PRACH resource within a preset period through a sequence of wireless subframes from front to back based on the target value.

* * * * *